US 008866575B2

(12) United States Patent
Wohlforth

(10) Patent No.: US 8,866,575 B2
(45) Date of Patent: Oct. 21, 2014

(54) AC POWER CONDITIONING CIRCUIT

(71) Applicant: USES, Inc., Quaker Hill, CT (US)

(72) Inventor: E. Brian Wohlforth, Quaker Hill, CT (US)

(73) Assignee: USES, Inc., Quaker Hill, CT (US)

( * ) Notice: Subject to any disclaimer, the term of this patent is extended or adjusted under 35 U.S.C. 154(b) by 0 days.

(21) Appl. No.: 14/010,664

(22) Filed: Aug. 27, 2013

(65) Prior Publication Data

US 2013/0342942 A1  Dec. 26, 2013

Related U.S. Application Data

(63) Continuation-in-part of application No. 13/015,694, filed on Jan. 28, 2011, now Pat. No. 8,791,782.

(51) Int. Cl.
| H01F 27/28 | (2006.01) |
| H01F 38/20 | (2006.01) |
| H01F 17/06 | (2006.01) |
| H01F 27/24 | (2006.01) |
| H02J 3/18 | (2006.01) |
| H01F 27/34 | (2006.01) |
| H01F 27/38 | (2006.01) |

(52) U.S. Cl.
CPC ............ *H01F 27/343* (2013.01); *H02J 3/1821* (2013.01); *H01F 27/345* (2013.01); *H01F 27/38* (2013.01)
USPC ........... 336/170; 336/173; 336/178; 336/184; 336/212

(58) Field of Classification Search
CPC .................................................... H01F 27/343

USPC ......................................................... 336/170
See application file for complete search history.

(56) References Cited

U.S. PATENT DOCUMENTS

| 1,647,928 | A |   | 11/1927 | Owen |
| 2,792,556 | A |   | 5/1957 | Oglesbee |
| 3,247,449 | A |   | 4/1966 | Medlar |
| 4,019,122 | A | * | 4/1977 | Ryan ............................. 323/307 |
| 4,019,124 | A |   | 4/1977 | Möltgen |
| 4,117,524 | A |   | 9/1978 | Parton et al. |
| 4,152,743 | A |   | 5/1979 | Comstock |

(Continued)

FOREIGN PATENT DOCUMENTS

| DE | 35 08 495 | 9/1986 |
| GB | 2 115 627 | 9/1983 |
| WO | WO 96/19861 | 6/1996 |

*Primary Examiner* — Elvin G Enad
*Assistant Examiner* — Ronald Hinson
(74) *Attorney, Agent, or Firm* — Lipsitz & McAllister, LLC

(57) ABSTRACT

A multi-coil choke for an AC power conditioner includes a magnetic core having first, second and third parallel legs. A first coil wrapped around the first leg terminates in first and second leads at respective ends. A second coil wrapped around the second leg terminates in first and second leads at respective ends. A third coil wrapped around the third leg terminates in first and second leads at respective ends. A fourth coil is formed from a proximal portion of the second lead of said first coil. The fourth coil is wrapped around a distal portion of the second lead of the third coil. A fifth coil is formed from a proximal portion of the second lead of the third coil. The fifth coil is wrapped around a distal portion of the second lead of the first coil. AC power conditioners using one or more such chokes are also disclosed.

16 Claims, 10 Drawing Sheets

(56) References Cited

U.S. PATENT DOCUMENTS

| | | | |
|---|---|---|---|
| 4,259,705 A | 3/1981 | Stifter | |
| 4,531,085 A | 7/1985 | Mesenhimer | |
| 4,584,622 A | 4/1986 | Crosby et al. | |
| 4,587,588 A | 5/1986 | Goldstein | |
| 4,672,298 A | 6/1987 | Rohatyn | |
| 4,739,436 A | 4/1988 | Stefani et al. | |
| 4,760,485 A | 7/1988 | Ari et al. | |
| 4,777,555 A | 10/1988 | Esculpavit et al. | |
| 4,802,055 A | 1/1989 | Beckerman | |
| 4,845,580 A | 7/1989 | Kitchens | |
| 4,866,560 A | 9/1989 | Allina | |
| 4,870,528 A | 9/1989 | Harford | |
| 4,870,534 A | 9/1989 | Harford | |
| 4,901,183 A | 2/1990 | Lee | |
| 5,012,218 A | 4/1991 | Haug et al. | |
| 5,055,815 A * | 10/1991 | Yamamoto et al. | 336/196 |
| 5,105,327 A * | 4/1992 | Wohlforth | 361/56 |
| 5,422,620 A | 6/1995 | Bitterli | |
| 5,942,828 A | 8/1999 | Hill | |
| 6,512,438 B1 | 1/2003 | Yoshimori et al. | |
| 6,980,077 B1 * | 12/2005 | Chandrasekaran et al. | 336/212 |
| 7,136,293 B2 * | 11/2006 | Petkov et al. | 363/126 |
| 7,142,081 B1 | 11/2006 | Shudarek | |
| 7,323,964 B1 * | 1/2008 | Shyu et al. | 336/131 |
| 2009/0167473 A1 * | 7/2009 | Hsieh | 336/170 |

\* cited by examiner

AC POWER CONDITIONING CIRCUIT

This application is a continuation-in-part of commonly-owned U.S. patent application Ser. No. 13/015,694 filed on Jan. 28, 2011, which is incorporated herein and made a part hereof by reference.

BACKGROUND OF THE INVENTION

The present invention relates to the distribution of AC power, and more particularly to apparatus for conditioning the power delivered and reducing energy usage.

Transient surges are common on all power systems. Lightning, generator switching, and major power line shorts are examples of externally generated surges. Transients up to twice the applied voltage are common and up to 50 times the applied voltage have been observed.

More common and more frequent are transient surges caused by inductive load devices such as motors, transformers, relay coil and fluorescent light ballasts. These are known as internally generated surges.

Various transient voltage surge suppressors are well known in the art. U.S. Pat. Nos. 4,152,743; 4,259,705; 4,584,622; 4,587,588; 4,739,436; 4,760,485; 4,777,555; 4,802,055; 4,845,580; 4,866,560; 4,870,528; 4,870,534; and 4,901,183 illustrate various transient voltage suppression systems, surge suppressors, and filters for use in the distribution of electrical power. These patents disclose circuits that use devices such as capacitors and varistors between power lines together with chokes in series with the power lines to filter AC power. None of these references discloses or suggests the provision of inductors across power lines or across a power line and the neutral line of a power source. These patents also fail to disclose apparatus for substantially reducing energy consumption.

Commonly assigned U.S. Pat. No. 5,105,327, incorporated herein by reference, discloses a power conditioner for AC power lines that has a choke and capacitor coupled in series across the power lines. The choke comprises a coil terminating in a line, with the line looped back through the coil. The power lines are thereby balanced to provide greater operating efficiency. Capacitors and transient suppressors are used for transient suppression and power factor correction.

Any load that requires a magnetic field to operate, for example motors, transformers, fluorescent lamp ballasts, solenoids, and the like will cause the phase relationship between voltage and current supplied by the utility to change. Such phase shifting reduces the efficiency of the load, resulting in increased power consumption.

The phase angle between voltage and current is called power factor. Inductive circuits have a lagging power factor because the current lags the voltage. Capacitive circuits have a leading power factor because the current leads the voltage. It is desirable to make the angle between voltage and current approach zero. When voltage and current are in phase, the power factor is unity and the most efficient utilization of the power distribution system is obtained.

It would be advantageous to provide apparatus for conditioning AC power to eliminate transients and surges and reduce the energy consumed by inductive and capacitive loads in a manner that improves upon the operation and efficiency of prior art devices, including the devices disclosed in U.S. Pat. No. 5,105,327. The present invention provides multi-coil chokes and power conditioner apparatus that can be implemented to achieve these and other advantages.

SUMMARY OF THE INVENTION

In accordance with the invention, a multi-coil choke is provided. The choke includes a magnetic core having a first leg, a second leg and a third leg. The three legs are substantially parallel to each other. A first coil is wrapped around the first leg. The first coil terminates in a first lead at a first end thereof and a second lead at a second end thereof. A second coil is wrapped around the second leg of the core and terminates in a first lead at a first end thereof and a second lead at a second end thereof. A third coil is wrapped around the third leg and terminates in a first lead at a first end thereof and a second lead at a second end thereof. A fourth coil is formed from a proximal portion of the second lead of the first coil. The fourth coil is wrapped around a distal portion of the second lead of the third coil. A fifth coil is formed from a proximal portion of the second lead of the third coil. The fifth coil is wrapped around a distal portion of the second lead of the first coil.

In a preferred embodiment, the distal portion of the second lead of said first coil passes through said third coil before passing through said fifth coil Likewise, the distal portion of the second lead of said third coil passes through said first coil before passing through said fourth coil.

The magnetic core can be formed from two rectangular closed cores placed side-by-side with adjacent sides forming the second leg. The first and third legs can each include a gap. The second leg can include substantially aligned gaps in the adjacent sides of the rectangular closed cores. The gaps can be centrally located along their respective legs. An additional gap can be provided along the length of the adjacent sides of the rectangular closed cores. Moreover, each of the rectangular closed cores can be contained within an insulating cover.

A multi-coil choke in accordance with a preferred embodiment of the invention has its first coil wrapped in one of a clockwise and counterclockwise direction, with the second and third coils being wrapped in the other of the clockwise and counterclockwise direction. More particularly, the first coil can be wrapped in a counterclockwise direction with the second and third coils wrapped in a clockwise direction. The fourth coil is wrapped in the same direction as the first coil, e.g., counterclockwise. The fifth coil is wrapped in the same direction as the third coil, e.g., clockwise.

A power conditioner for AC power lines in accordance with the invention includes a multi-coil choke and at least one capacitor. Means are provided for coupling the choke and at least one capacitor in series across an AC power source. The choke comprises a magnetic core having a first leg, a second leg and a third leg. The legs of the core are substantially parallel to each other. A first coil is wrapped around the first leg. The first coil terminates in a first lead at a first end thereof and a second lead at a second end thereof. A second coil is wrapped around the second leg. The second coil terminates in a first lead at a first end thereof and a second lead at a second end thereof. A third coil is wrapped around the third leg and terminates in a first lead at a first end thereof and a second lead at a second end thereof. A fourth coil is formed from a proximal portion of the second lead of the first coil. The fourth coil is wrapped around a distal portion of the second lead of the third coil. A fifth coil is formed from a proximal portion of the second lead of the third coil. The fifth coil is wrapped around a distal portion of the second lead of the first coil.

The power conditioner can have a plurality of the multi-coil chokes, each coupled in series with at least one capacitor across a respective AC power source. In such an embodiment, the coupling means are adapted to couple each of the multi-coil chokes with the first and fourth coils in series with at least one capacitor across a respective AC power source, the second coil in series with at least one capacitor across a respective AC power source, and the third and fifth coils in series with at least one capacitor across a respective AC power source.

In an embodiment with a single multi-coil choke, the coupling means can be adapted to couple the first and fourth coils in series with at least one capacitor across a respective AC power source, the second coil in series with at least one capacitor across a respective AC power source; and the third and fifth coils in series with at least one capacitor across a respective AC power source.

The magnetic core can be formed from two rectangular closed cores placed side-by-side with adjacent sides forming the second leg. Each of the first and third legs can include a gap. The second leg can include substantially aligned gaps in the adjacent sides of the rectangular closed cores. The gaps in the first, second and third legs can be centrally located along their respective legs. An additional gap can reside along the length of the adjacent sides of the rectangular closed cores. This additional gap can result, e.g., from the provision of an insulating cover on each of the rectangular closed cores.

In an alternate embodiment of the present invention, the gap along the adjacent sides of the rectangular closed cores can be omitted. In such an embodiment, the gaps in the first, second and third legs can be maintained, such that the core structure is comprised of two E-shaped core components facing each other to form two magnetic cores, a first magnetic core being formed between the first leg and the second leg and a second magnetic core being formed between the second leg and the third leg. A multi-coil choke can be formed from this core structure in the same manner as discussed above, and such a multi-coil choke can be used to implement the various power conditioner embodiments discussed above as well.

BRIEF DESCRIPTION OF THE DRAWINGS

Referring now to the figures, wherein like elements are numbered alike.

DETAILED DESCRIPTION OF THE INVENTION

Figure 1:
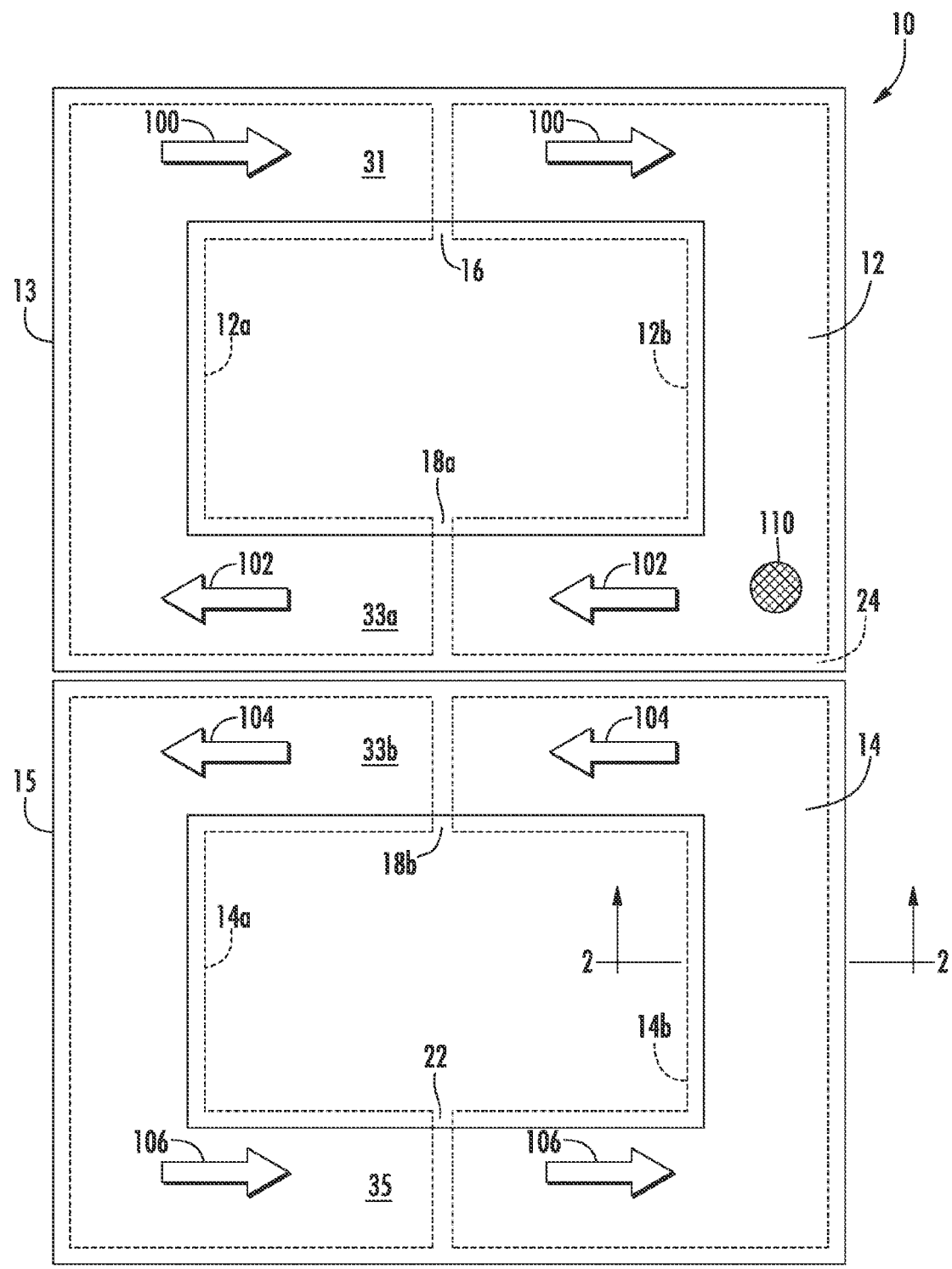
FIG. 1 is a diagram showing a magnetic core structure on which a choke in accordance with the invention can be wound.

A power conditioner for alternating current in accordance with the invention uses a unique multi-coil choke. Referring to FIG. 1, a magnetic core structure 10 is shown that can be used to fabricate a choke in accordance with the invention. The choke can be fabricated, for example, using two side by side cores 12 and 14. Such cores can comprise, for example, "Snap-together Torroid Choke" cores available from Radio Shack under Catalog No. 273-104. These cores include a ferrite core with a plastic outer cover. In particular, cover 13 (shown in a solid line) is illustrated surrounding core sections 12a, 12b (shown in dashed lines) and cover 15 (shown in a solid line) is shown surrounding core sections 14a, 14b (shown in dashed lines).

Each of the cores 12 and 14 is constructed from two C-shaped ferrite core components 12a, 12b and 14a, 14b respectively that, when assembled side by side within the plastic outer covers 13, 15 respectively, form gaps where the top and bottom ends of each "C" meet. These gaps can be seen at reference numerals 16 and 18a in the core 12. Similar gaps 18b and 22 are shown in the core 14. When the two cores 12 and 14 are placed side by side as shown in FIG. 1, an additional gap 24 is formed along the adjacent sides of the cores. It is noted that the gap 24 comprises the space between the actual ferrite cores (i.e., between the dashed lines) which is mostly dictated by the thickness of the walls of the plastic cover portions 13, 15 that reside within the gap.

The core structure shown in FIG. 1 results in three legs around which wire coils are wound in accordance with the invention. These are a top leg 31, middle leg 33a, 33b and bottom leg 35. As can be seen, the top leg 31 is part of core 12, the bottom leg 35 is part of core 14, and the middle leg 33a, 33b comprises portions of both cores 12 and 14. A dot 110 (e.g., paint) can be placed, for example, on the lower right corner of core 12 to assist a person in maintaining the core structure in a proper orientation when winding coils on the legs. This is important, as proper operation of the choke will depend on the directions in which the various coils are wound.

When the coils are properly wound in accordance with the invention, as will be explained below, the magnetic field created when the choke is energized will be oriented in the directions shown by arrows 100, 102, 104 and 106. In particular, the field in the first leg 31 will be oriented from left to right as designated by arrows 100. The field in the second leg 33a, 33b will be oriented from right to left as designated by arrows 102, 104. The field in the third leg 35 will be oriented from left to right as designated by arrows 106. It should be appreciated that the coils can also be wrapped such that the magnetic fields will be oriented in directions opposite to those shown in the example of FIG. 1.

Figure 2:
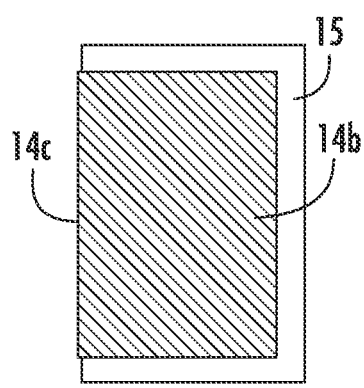
FIG. 2 is a cross-sectional view of a portion of the core.

FIG. 2 is a cross section of the core taken along the line 2-2 shown in FIG. 1. In particular, FIG. 2 illustrates the ferrite core 14b inside of plastic cover 15. The cover 15 acts as an insulating jacket for the core. It is noted that the cover 15 covers three sides of the core 14b, with the side 14c of the ferrite core being exposed.

Figure 3:
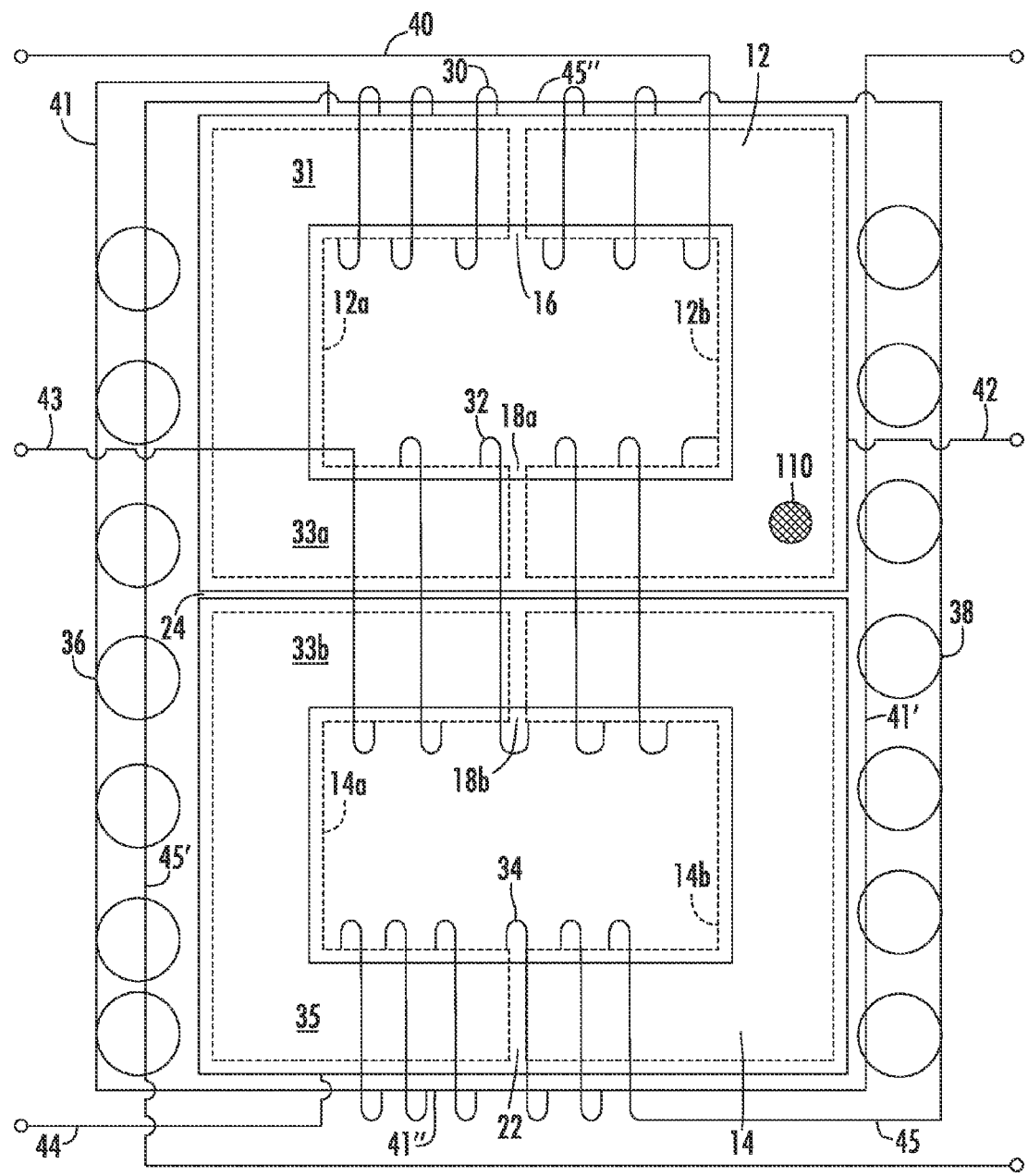
FIG. 3 is an enlarged view of the core with windings thereon to form a multi-coil choke in accordance with the invention.

FIG. 3 is an enlarged, detailed view of a choke in accordance with the invention that has been wound on the core structure 10 of FIG. 1. The choke has five coils, three of which (first coil 30, second coil 32 and third coil 34) are wound around respective legs 31, 33a,b and 35 of the core. A fourth coil 36 is wound around a lead portion of the third coil. The fifth coil 38 is wound around a lead portion of the first coil. The choke is adapted for use in various embodiments of AC power conditioners, also referred to as "shunt efficiency" systems. Examples of such power conditioners are provided in FIGS. 4-8.

In the choke embodiment illustrated in FIG. 3, first coil 30 is wrapped around first leg 31 of core 12. Second coil 32 is wrapped around a second leg, which consists of leg 33a of core 12 and adjacent leg 33b of core 14. Third coil 34 is wrapped around a third leg 35 of core 14. As indicated, the gaps 16 and 22 are centered along first leg 31 and third leg 35, respectively. Similarly, gaps 18a and 18b (together referred to as gap 18) are generally aligned in a centered position along second leg 33a, 33b. As can be seen in FIG. 1, the three legs 31, 33a,b and 35 are substantially parallel to each other.

The direction in which the first, second and third coils are wrapped around their respective legs is important to the operation of the multi-coil choke and, more particularly, to power conditioners fabricated from the choke. In particular, the first coil 30 is wrapped in one direction (e.g., counterclockwise) and the second and third coils 32, 34 are wrapped in the opposite direction (e.g., clockwise). It should be appreciated that these directions can be reversed, as long as the relationships between the coils are maintained.

Although the number of turns present in each coil can vary depending on the requirements of the circuit in which the choke is used, typically each of coils 30, 32 and 34 will have 4-6 turns of, e.g., 12 AWG insulated stranded copper wire. In the illustrated embodiment, each of the first, second and third coils 30, 32 and 34 has five turns, with the first coil wrapped around leg 31 in a counterclockwise direction and the second and third coils wrapped around leg 33a, 33b and 35, respectively, in a clockwise direction. Also in the illustrated embodiment, fourth and fifth coils 36 and 38, respectively, have seven turns.

Fourth coil 36 extends from the first coil 30 and fifth coil 38 extends from the third coil 34. As can be seen in the figures, first coil 30 has a first lead 40 and a second lead 41. The fourth coil 36 is formed from a portion of second lead 41 that is proximal to first coil 30. Likewise, third coil 34 has a first lead 44 and a second lead 45. The fifth coil 38 is formed from a portion of second lead 45 that is proximal to the third coil 34.

The fourth coil 36 is wrapped around a portion 45' of the second lead 45 of the third coil 34 that is distal to the third coil 34. Similarly, the fifth coil 38 is wrapped around a portion 41' of the second lead 41 of first coil 30 that is distal to the first coil 30. On its way to the fourth coil 36, the second lead 45 of the third coil passes through the first coil 30 as shown at 45". This occurs after formation of the fifth coil 38 in the second lead 45. As a result of this structure, the distal portion of the second lead 45 of the third coil 34 passes through the first coil 30 before passing through the fourth coil 36.

In the same manner, on its way to the fifth coil 38, the second lead 41 of the first coil passes through the third coil 34 as shown at 41". This occurs after the formation of the fourth coil 36 in the second lead 41 of coil 30. As a result, the distal portion of the second lead 41 of the first coil 30 passes through the third coil 34 before passing through the fifth coil 38.

The unique choke shown in FIG. 3 can be used in any of a variety of different power conditioner implementations. These include, for example, 120/240 volt single phase residential/recreational units, as well as 208, 240, 480 and 600 volt three phase commercial/industrial units (for three, four, and five wire applications). Various such embodiments are shown in FIGS. 4-8. It is noted that for clarity in the drawings, the air gaps 16, 18, 22 and 24 of the chokes, which are shown in the enlarged views of FIGS. 1 and 3, are not illustrated in FIGS. 4-8. However, each of the chokes in FIGS. 4-8 may have these air gaps. As discussed in detail below in connection with FIGS. 9 and 10, in an alternate embodiment the air gap 24 may be omitted.

Figure 4:
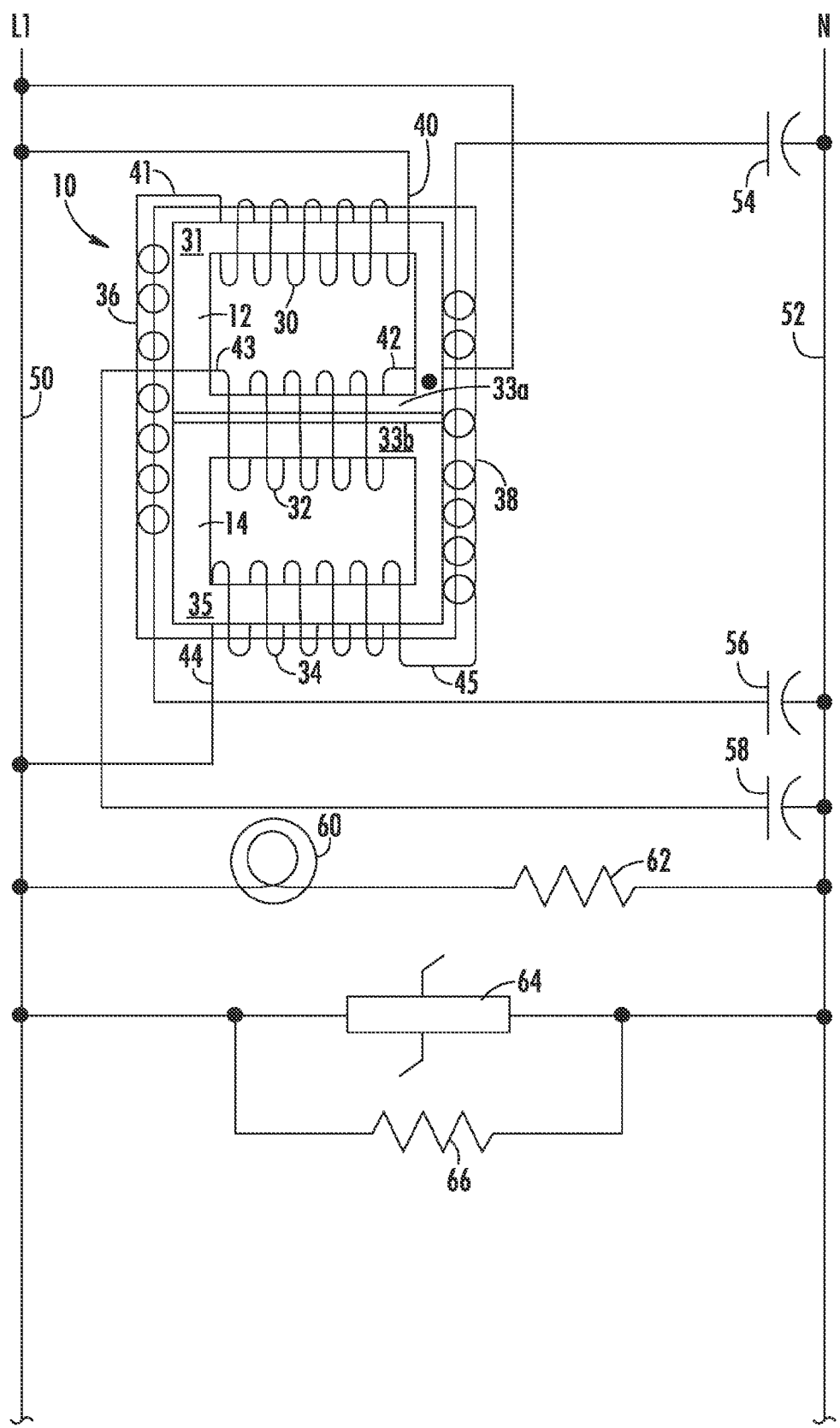
FIG. 4 is a schematic diagram of a single phase power conditioner using one choke in accordance with the invention.

FIG. 4 is a schematic diagram of an example single phase 120 volt power conditioner implementation. In this embodiment, the first lead 40 of the first coil 30 is connected to the line 50 (L1) of an AC power source to be conditioned. The second lead 41 of the first coil 30 is connected at its free end to the neutral 52 (N) of the AC power source via a capacitor 54. Similarly, the first lead 44 of the third coil 34 is connected to the line 50 (L1) of the AC power source, and the second lead 45 is connected at its free end to neutral 52 through a capacitor 56. Second coil 32 is coupled between line 50 and neutral 52 as well. In particular, line 42 of second coil 32 is coupled to line 50 (L1) and line 43 of the second coil 32 is coupled to neutral 52 (N) via capacitor 58.

The embodiment of FIG. 4 includes various additional components. A lamp 60 (e.g., LED or incandescent) is connected between line 50 and neutral 52 via a current limiting resistor 62. Transient suppression is provided by a varistor (e.g., MOV) 64 coupled between L1 and neutral. A bleed resistor 66 is coupled in parallel with varistor 64 to bleed off stored charges, thereby reducing the possibility of electrical shock to an electrician working with the unit after power has been turned off.

Figure 5:
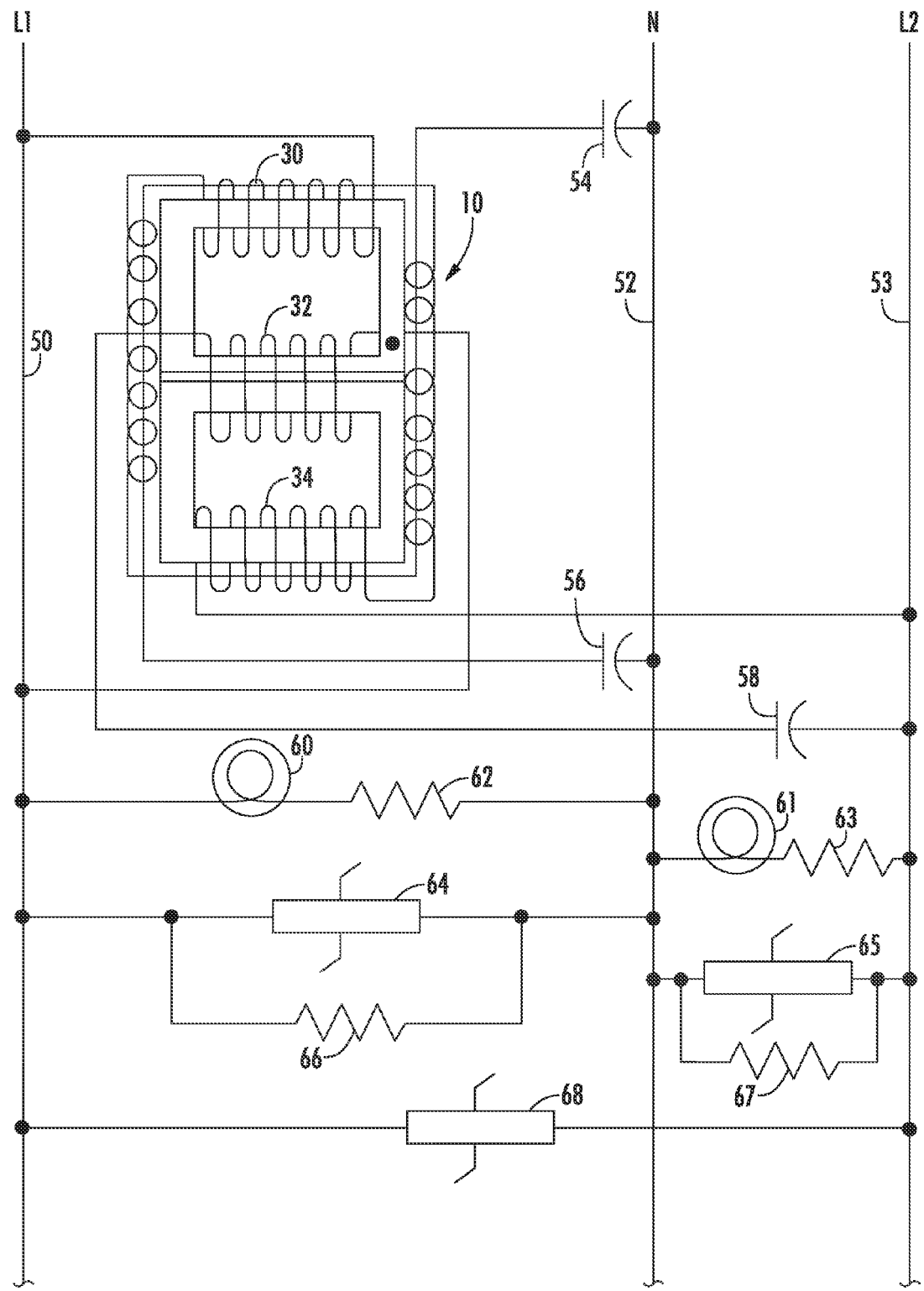
FIG. 5 is a schematic diagram of a three-phase power conditioner using one choke in accordance with the invention.

FIG. 5 is a schematic diagram of an example 240 volt recreational unit (e.g., for watercraft) having line 50 (L1), line 53 (L2) and neutral 52 (N). As with the embodiment of FIG. 4, a single choke 10 is used with the first, second and third coils 30, 32, 34 coupled as shown. Additional components in this implementation include lamp 61 and series resistor 63, varistor 65 with parallel bleed resistor 67, and varistor 68.

Figure 6:
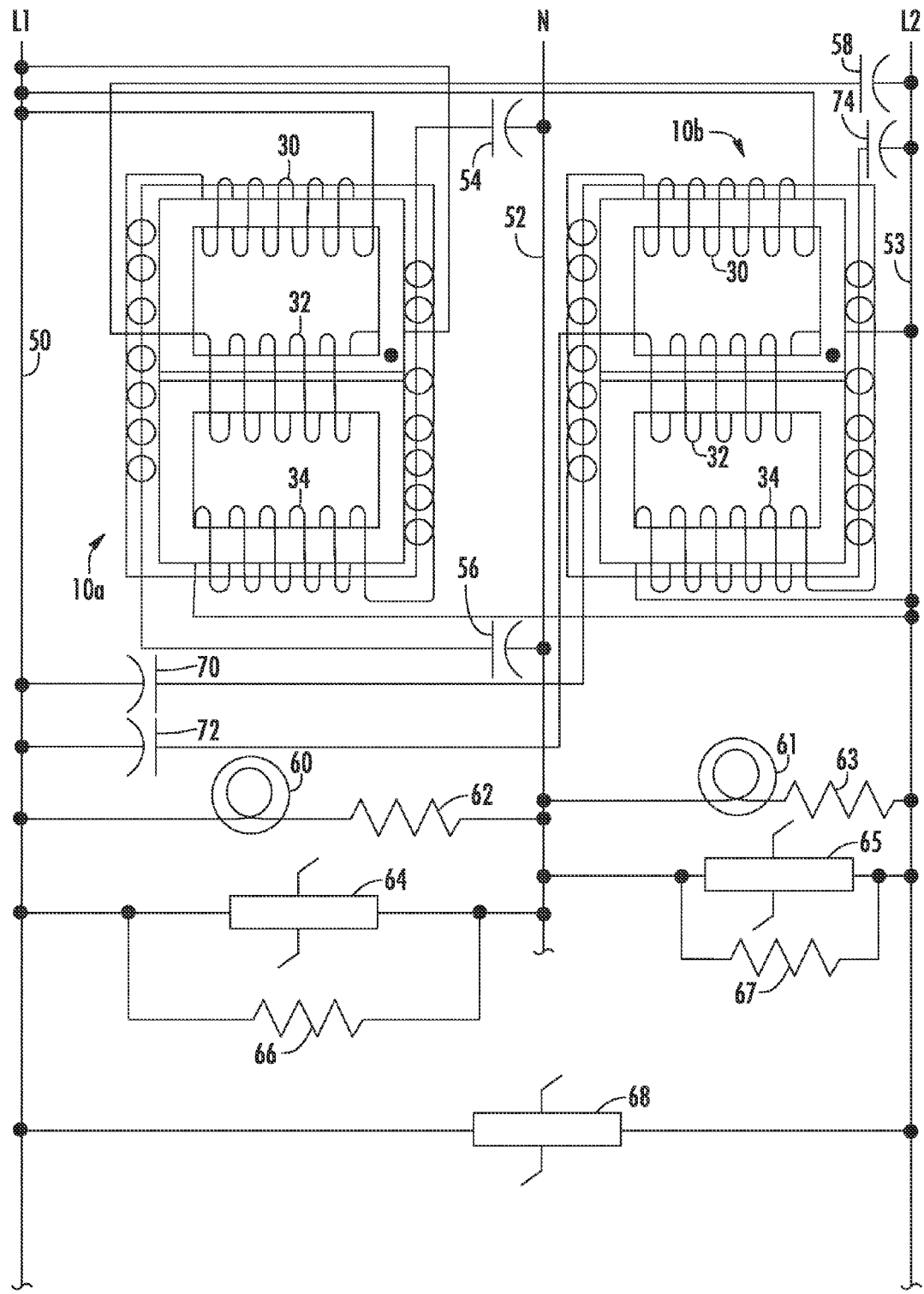
FIG. 6 is a schematic diagram of a three-phase power conditioner using two chokes in accordance with the invention.

FIG. 6 shows an example 240 volt three phase power conditioner implementation using the multi-coil chokes 10 of the present invention. In this embodiment, two identical chokes 10a and 10b are used. These chokes are the same as choke 10 illustrated in FIG. 3. The first, second and third coils 30, 32 and 34 of each choke are coupled to lines L1, L2 and N of the AC power source as shown. Additional components in this implementation include capacitors 70, 72 and 74.

Figure 7:
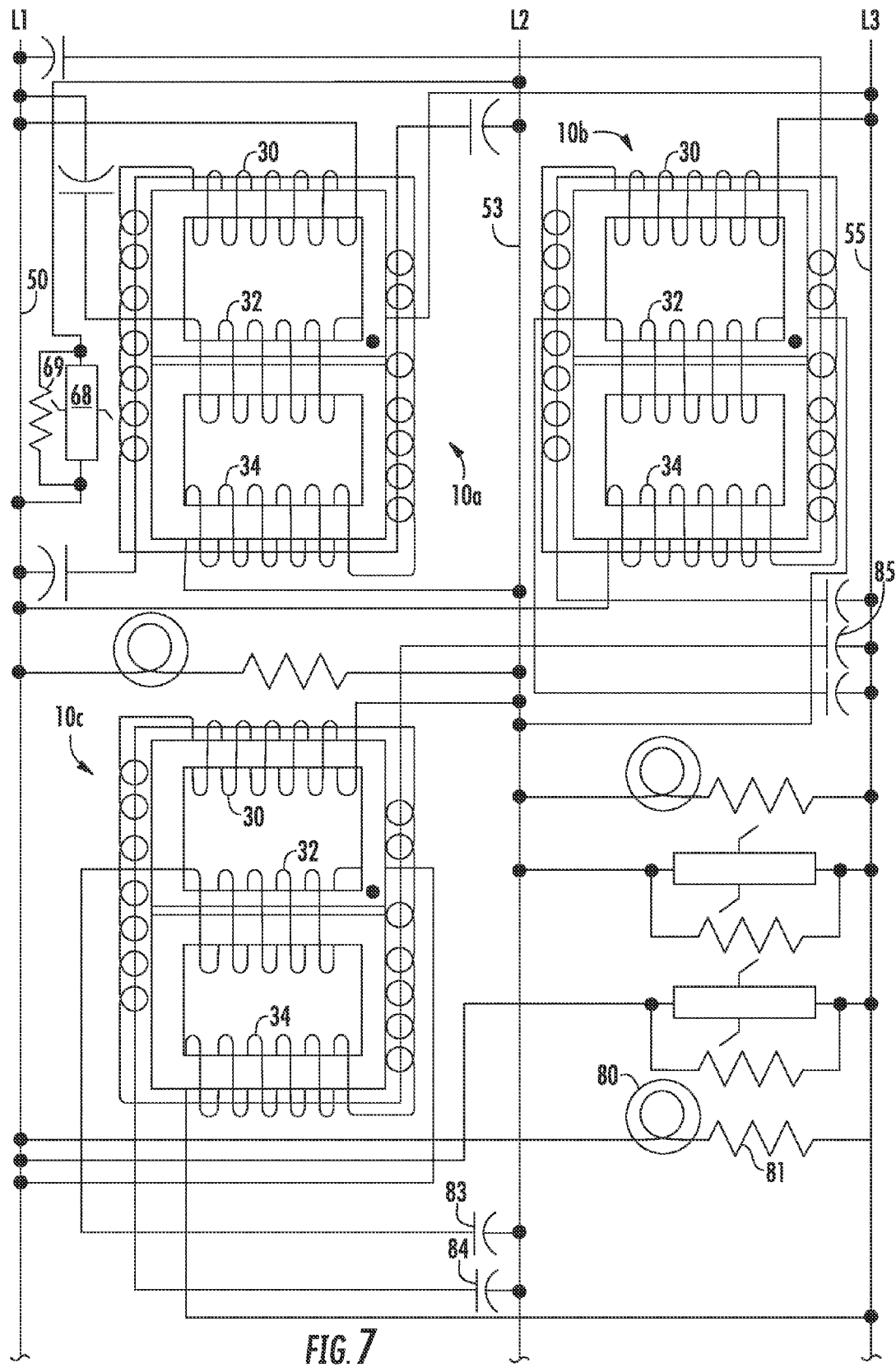
FIG. 7 is a schematic diagram of a three-phase three-line power conditioner using three chokes in accordance with the invention.

FIG. 7 shows a three phase embodiment suitable, e.g., for a 480 volt power conditioner installed on an AC source having three hot lines 50 (L1), 53 (L2) and 55 (L3). Three chokes 10a, 10b and 10c are provided, each having the same configuration of the choke 10 shown in FIG. 3. The first, second and third coils 30, 32 and 34 of each choke are coupled to lines L1, L2 and L3 of the power source as shown. Additional components in this implementation include lamp 80 and series resistor 81, and capacitors 83, 84 and 85. An additional bleed resistor 69 is also provided across varistor 68.

Figure 8:
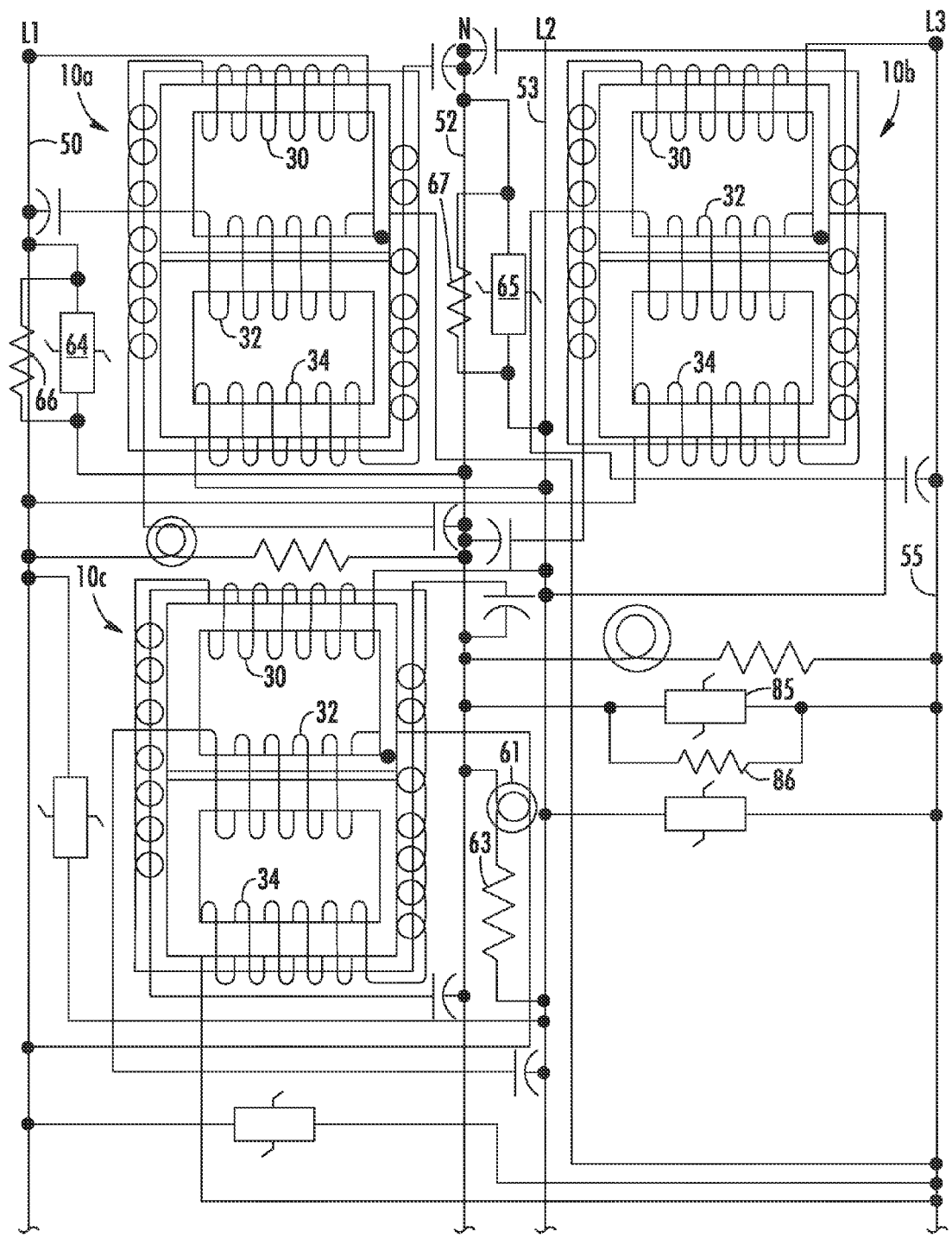
FIG. 8 is a schematic diagram of a three-phase three-line with neutral power conditioner using three chokes in accordance with the invention.

FIG. 8 is a schematic diagram of an example power conditioner used for, e.g., a 208 volt or 480 volt 3 phase Y configured AC power source. Such a power source has three hot lines and a neutral. These are shown in FIG. 8 as line 50 (L1), line 53 (L2), line 55 (L3) and neutral 52 (N). Three chokes 10a, 10b and 10c are provided, each having the same configuration of the choke 10 shown in FIG. 3. The first, second and third coils 30, 32 and 34 of each choke are coupled to lines L1, L2 L3 and N of the power source as shown. Additional components in this implementation include varistor 85 and resistor 86.

The multi-coil choke of the present invention provides power conditioners with improved transient and surge protection as well as substantial energy savings over prior art power conditioners, including significant improvements over the power conditioners disclosed in U.S. Pat. No. 5,105,327. Transient and surge protection is provided by the various capacitors and transient suppressors. As shown in the drawings, capacitors are provided across power lines. Transient suppressors, such as metal oxide varistor ("MOV") devices can be placed at various points throughout the circuit. An MOV can be placed across incoming power lines. An MOV can be coupled from incoming lines to neutral. MOVs can be placed between neutral and ground. Bleed resistors across the transient suppressors take down the charge held by the circuit to protect against electrical shock when the unit is disconnected from the AC power source.

The values of the various components shown will depend upon the AC power source to be conditioned and the loads to be protected by the power conditioners. Typically, the capacitors will be between 25-100 microfarads and will have a voltage limit that is suitable for the maximum voltage to be applied to the power conditioner. The bleed down resistors placed across the varistors will be on the order of 30KΩ to 100KΩ or more with a typical power rating of 2 watts. The MOV devices used for the transient suppressors will typically be selected to have a rating of about 40,000 joules each.

Figure 9:
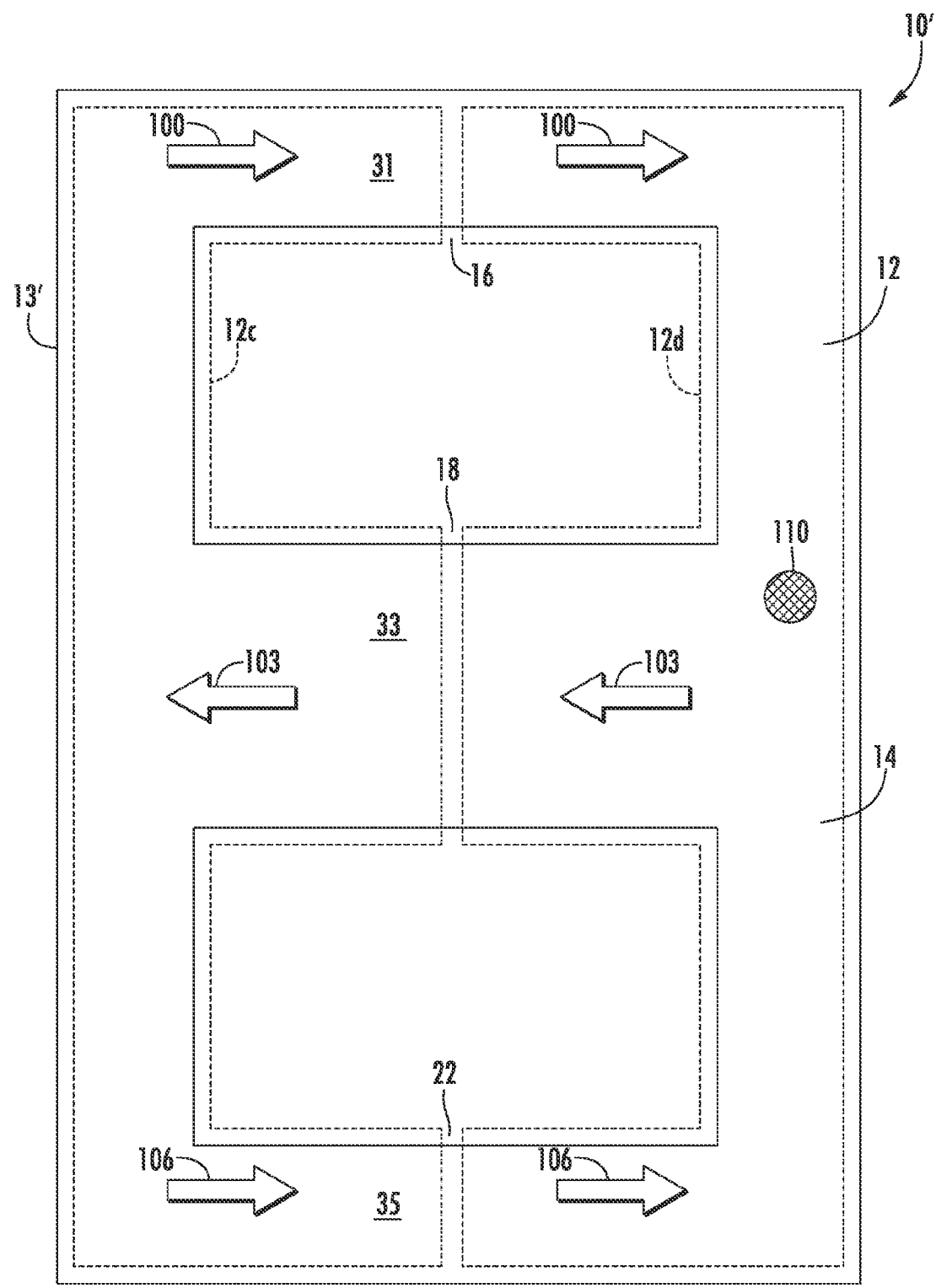
FIG. 9 is a diagram showing an alternate embodiment of a magnetic core structure on which a choke in accordance with the invention can be wound.
Figure 10:
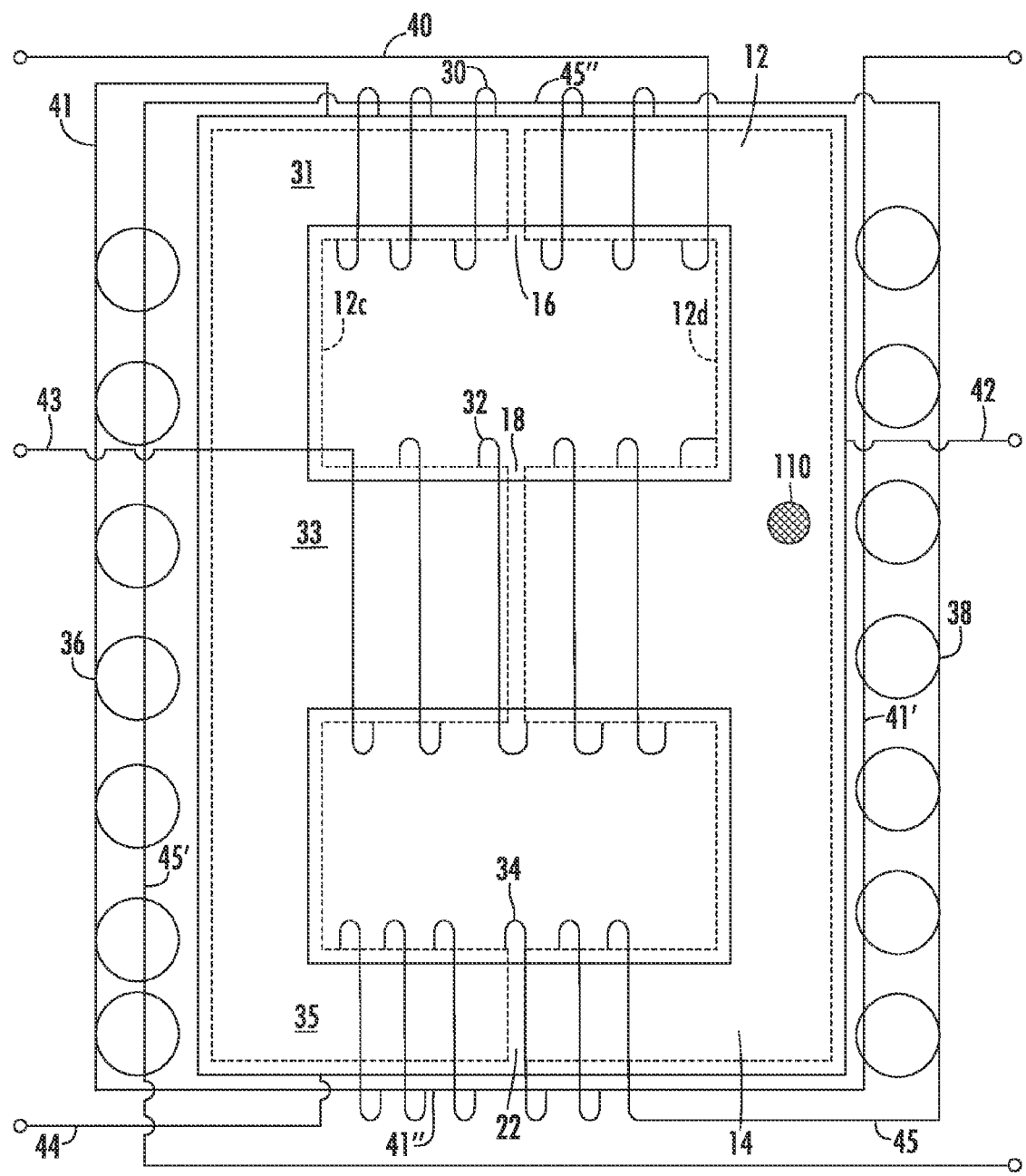
FIG. 10 is an enlarged view of the core structure of FIG. 9 with windings thereon to form a multi-coil choke in accordance with the invention.

An alternate embodiment of a magnetic core structure 10' is shown in FIG. 9 which can also be used to fabricate a choke (as shown in FIG. 10) for use in the various types of power conditioners described above in connection with FIGS. 4-8. The core structure 10' shown in FIG. 9 differs from the core structure 10 shown in FIG. 1 only in that the air gap 24 between cores 12 and 14 has been removed and the covers 13 and 15 covering each core 12, 14 in FIG. 1 are merged together to form a single cover 13', which is optional. This results in two E-shaped core components 12c and 12d facing each other (i.e., one regular E-shaped core component 12c and one mirror image E-shaped core component 12d, with open ends of each core component 12c, 12d facing each other and aligned) to form the cores 12 and 14. The core 12 is formed between the first leg 31 and the middle leg 33, while the core 14 is formed between the middle leg 33 and the bottom leg 35. Air gaps 16 and 22 remain between core components 12c and 12d in the top leg 31 and the bottom leg 35, respectively. The air gaps 18a and 18b shown in FIG. 1 in the middle leg 33a, 33b are merged in the FIG. 9 embodiment to form air gap 18 in middle leg 33. The remaining core structure 10' shown in FIG. 9 is analogous to that shown in FIG. 1 and discussed above.

FIG. 10 illustrates an example embodiment of a choke fabricated from the core structure 10' shown in FIG. 9. The FIG. 10 embodiment is similar to the choke embodiment shown in FIG. 3 and discussed above (with the exceptions of the differences noted above between FIGS. 1 and 9). In particular, from FIG. 10 it should be appreciated that the removal of the air gap 24 from the FIG. 1 embodiment does not affect the arrangement or windings of the coils 30, 32, 34, 36, and 38 shown in FIG. 3 and described above.

Accordingly the choke embodiment shown in FIG. 10 behaves substantially similar to the choke embodiment shown in FIG. 3 described above. In particular, the magnetic field produced by the choke embodiment of FIG. 10 is substantially similar to that produced by the choke embodiment of FIG. 3 (e.g., with the magnetic fields 102 and 104 of FIG. 3 being equal to or slightly less than magnetic field 103 shown in FIG. 10). Further, the air gaps 16, 18 and 22 in the legs 31, 33, and 35 of the FIG. 10 embodiment remain and aid in preventing saturation of the choke 10'.

Therefore, the choke embodiment shown in FIG. 10 may be used to form the various power conditioner implementations shown in FIGS. 4-8 and described above, and such power conditioner embodiments formed from the FIG. 10 choke embodiment will perform similarly thereto. Those skilled in the art will appreciate that the choke embodiment shown in FIG. 10 is advantageous if more than one choke (or more than one power conditioner unit having at least one choke) is to be used in the same installation, as the first coil 30 and the third coil 34 are not isolated from one another via an air gap (as is the case with the FIG. 3 embodiment as a result of air gap 24). As a result of eliminating the air gap 24 of FIG. 3, the overall inductance of the FIG. 10 choke embodiment is slightly higher than in the FIG. 3 embodiment while the overall impedance is slightly lower.

Power conditioners using the multi-coil chokes disclosed herein are frequency independent, so that they can work on both 60 Hz line current found in North America as well as on 50 Hz current used elsewhere in the world. Power conditioners manufactured using the inventive chokes are vastly improved over prior art devices due to various factors, including the three leg core design, the provision of five coils in each choke with the winding configuration taught herein, and the four separate air gaps provided in the core. These air gaps are shown most clearly in FIG. 1 as gaps 16, 18a, 18b, 22 and 24 and in FIG. 9 as gaps 16, 18, and 22. Tests have shown that energy savings are about double the savings provided by prior art devices of the type shown in U.S. Pat. No. 5,105,327, with faster surge suppression and the ability to handle larger surges. The improvements in surge suppression are achieved, at least in part, due to the multiple air gaps provided in the chokes which prevent the chokes from saturating. Better filtering is also provided by power conditioners using the chokes of the present invention.

The components of the power conditioner can be provided in a module that is connected to a user's power lines at the service panel. Alternatively, the module can be connected to the user's power lines at a load. A plurality of such modules can be provided throughout a commercial establishment or residence. For example, one module can be installed at each fluorescent light fixture in an office building or on each separate line feeding such lighting fixtures. Connections to the module are made at taps on the power lines. There is no need to cut the power lines when installing the module, since none of the components are placed in series with any of the lines.

While the present invention has been described with reference to various example embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A multi-coil choke for an AC power conditioner, comprising:
   a magnetic core structure having a first leg, a second leg and a third leg, said legs being substantially parallel to each other, the magnetic core structure being in the form of two E-shaped core components facing each other to form two magnetic cores, a first magnetic core being formed between the first leg and the second leg and a second magnetic core being formed between the second leg and the third leg;
   a first coil wrapped around said first leg;
   a second coil wrapped around said second leg;
   a third coil wrapped around said third leg;
   a fourth coil wrapped around a lead portion of said third coil but not being wrapped around the core;
   a fifth coil wrapped around a lead portion of said first coil but not being wrapped around the core;
   wherein:
      said first leg includes a first air gap, the first coil extending over and completely across the first air gap;

said second leg includes a second air gap, the second coil extending over and completely across the second air gap;

said third leg includes a third air gap, the third coil extending over and completely across the third air gap; and the first, second and third air gaps completely separate the two E-shaped core components.

2. A multi-coil choke in accordance with claim 1, wherein:

the first coil terminates in a first lead at a first end thereof and a second lead at a second end thereof;

the second coil terminates in a first lead at a first end thereof and a second lead at a second end thereof;

the third coil terminates in a first lead at a first end thereof and a second lead at a second end thereof;

the fourth coil is formed from a proximal portion of the second lead of said first coil;

the fourth coil is wrapped around a distal portion of the second lead of said third coil;

the fifth coil is formed from a proximal portion of the second lead of said third coil; and the fifth coil is wrapped around a distal portion of the second lead of said first coil.

3. A multi-coil choke in accordance with claim 2, wherein:

the distal portion of the second lead of said first coil passes through said third coil before passing through said fifth coil; and the distal portion of the second lead of said third coil passes through said first coil before passing through said fourth coil.

4. A multi-coil choke in accordance with claim 1, wherein said gaps are centrally located along their respective legs.

5. A multi-coil choke in accordance with claim 1, wherein the magnetic core structure is contained within an insulating cover.

6. A multi-coil choke in accordance with claim 1, wherein said first coil is wrapped in one of a clockwise and counterclockwise direction, and said second and third coils are wrapped in the other of said clockwise and counterclockwise direction.

7. A multi-coil choke in accordance with claim 6, wherein said fourth coil is wrapped in the same direction as said first coil and said fifth coil is wrapped in the same direction as said third coil.

8. A multi-coil choke in accordance with claim 1, wherein said first and fourth coils are wrapped in a counterclockwise direction, and said second, third and fifth coils are wrapped in a clockwise direction.

9. A power conditioner for AC power lines comprising:

a multi-coil choke;

at least one capacitor; and means for coupling said choke and at least one capacitor in series across an AC power source;

said choke comprising:

a magnetic core structure having a first leg, a second leg and a third leg, said legs being substantially parallel to each other, the magnetic core structure being in the form of two E-shaped core components facing each other to form two magnetic cores, a first magnetic core being formed between the first leg and the second leg and a second magnetic core being formed between the second leg and the third leg;

a first coil wrapped around said first leg;

a second coil wrapped around said second leg;

a third coil wrapped around said third leg;

a fourth coil wrapped around a lead portion of said third coil but not being wrapped around the core;

a fifth coil wrapped around a lead portion of said first coil but not being wrapped around the core;

wherein:

said first leg includes a first air gap, the first coil extending over and completely across the first air gap;

said second leg includes a second air gap, the second coil extending over and completely across the second air gap;

said third leg includes a third air gap, the third coil extending over and completely across the third air gap; and the first, second and third air gaps completely separate the two E-shaped core components.

10. A power conditioner in accordance with claim 9, wherein:

the first coil terminates in a first lead at a first end thereof and a second lead at a second end thereof;

the second coil terminates in a first lead at a first end thereof and a second lead at a second end thereof;

the third coil terminates in a first lead at a first end thereof and a second lead at a second end thereof;

the fourth coil is formed from a proximal portion of the second lead of said first coil;

the fourth coil is wrapped around a distal portion of the second lead of said third coil;

the fifth coil is formed from a proximal portion of the second lead of said third coil; and the fifth coil is wrapped around a distal portion of the second lead of said first coil.

11. A power conditioner in accordance with claim 10, wherein:

the distal portion of the second lead of said first coil passes through said third coil before passing through said fifth coil; and the distal portion of the second lead of said third coil passes through said first coil before passing through said fourth coil.

12. A power conditioner in accordance with claim 10, comprising a plurality of said multi-coil chokes, each coupled in series with at least one capacitor across a respective AC power source.

13. A power conditioner in accordance with claim 12, wherein said means for coupling are adapted to couple each of said multi-coil chokes with:

said first and fourth coils in series with at least one capacitor across a respective AC power source;

said second coil in series with at least one capacitor across a respective AC power source; and said third and fifth coils in series with at least one capacitor across a respective AC power source.

14. A power conditioner in accordance with claim 10, wherein said means for coupling are adapted to couple:

said first and fourth coils in series with at least one capacitor across a respective AC power source;

said second coil in series with at least one capacitor across a respective AC power source; and said third and fifth coils in series with at least one capacitor across a respective AC power source.

15. A power conditioner in accordance with claim 9, wherein said gaps are centrally located along their respective legs.

16. A power conditioner in accordance with claim 9, wherein the magnetic core structure is contained within an insulating cover.

* * * * *